US007781994B2

United States Patent
Walter et al.

(10) Patent No.: US 7,781,994 B2
(45) Date of Patent: Aug. 24, 2010

(54) METHOD AND CIRCUIT FOR REGULATING THE SPEED OF A COMMUTATOR SERIES-WOUND MOTOR

(75) Inventors: Roland Walter, Tiefenbronn (DE); Bastian Kloer, Stuttgart (DE); Klaus Dengler, Kornwestheim (DE)

(73) Assignee: Robert Bosch GmbH, Stuttgart (DE)

( * ) Notice: Subject to any disclaimer, the term of this patent is extended or adjusted under 35 U.S.C. 154(b) by 314 days.

(21) Appl. No.: 12/091,265

(22) PCT Filed: Nov. 17, 2006

(86) PCT No.: PCT/EP2006/068596

§ 371 (c)(1),
(2), (4) Date: Apr. 23, 2008

(87) PCT Pub. No.: WO2007/080022

PCT Pub. Date: Jul. 19, 2007

(65) Prior Publication Data

US 2008/0284361 A1     Nov. 20, 2008

(30) Foreign Application Priority Data

Dec. 29, 2005   (DE) ................. 10 2005 062 864

(51) Int. Cl.
*H02P 25/14* (2006.01)
(52) U.S. Cl. .................. 318/245; 318/244; 318/268; 318/287; 318/296

(58) Field of Classification Search ................. 318/244, 318/245, 246, 251, 287, 296, 367, 368, 369; 388/800, 806, 816, 821, 907.5, 917
See application file for complete search history.

(56) References Cited

U.S. PATENT DOCUMENTS 2,799,818 A * 7/1957 Brown ................. 318/245
3,582,738 A * 6/1971 Claassen ................. 318/249

(Continued)

FOREIGN PATENT DOCUMENTS

DE          34 22 458           12/1985

(Continued)

*Primary Examiner*—Bentsu Ro
*Assistant Examiner*—Thai Dinh
(74) *Attorney, Agent, or Firm*—Michael J. Striker

(57) ABSTRACT

The invention relates to a method and a circuit for regulating the speed of a commutator series-wound motor, especially a universal motor (10), which is supplied with a current from an a.c. voltage source (22) by means of a semiconductor switching element (18) mounted in series with an armature winding (12) and a field winding (14, 16) and controlled by a control unit (28) according to a nominal speed value. The control unit (28) receives, as input signals, signals corresponding to the total voltage drop (Umot) when the motor (10) is supplied with a current, and a substitute signal for the intensity of the motor current (I), corresponding to the voltage drop (Ua, Ufa) on the armature (12) alone or on the armature (12) and on a part (14) of the field winding (14, 16). The input signals of the control unit (28) are compared with motor-typical characteristic lines of the voltages on the excitation field (14) and/or on the armature, stored in the control unit, and control signals for the semiconductor switching element are formed from the deviations.

11 Claims, 2 Drawing Sheets

U.S. PATENT DOCUMENTS

Figure 1:
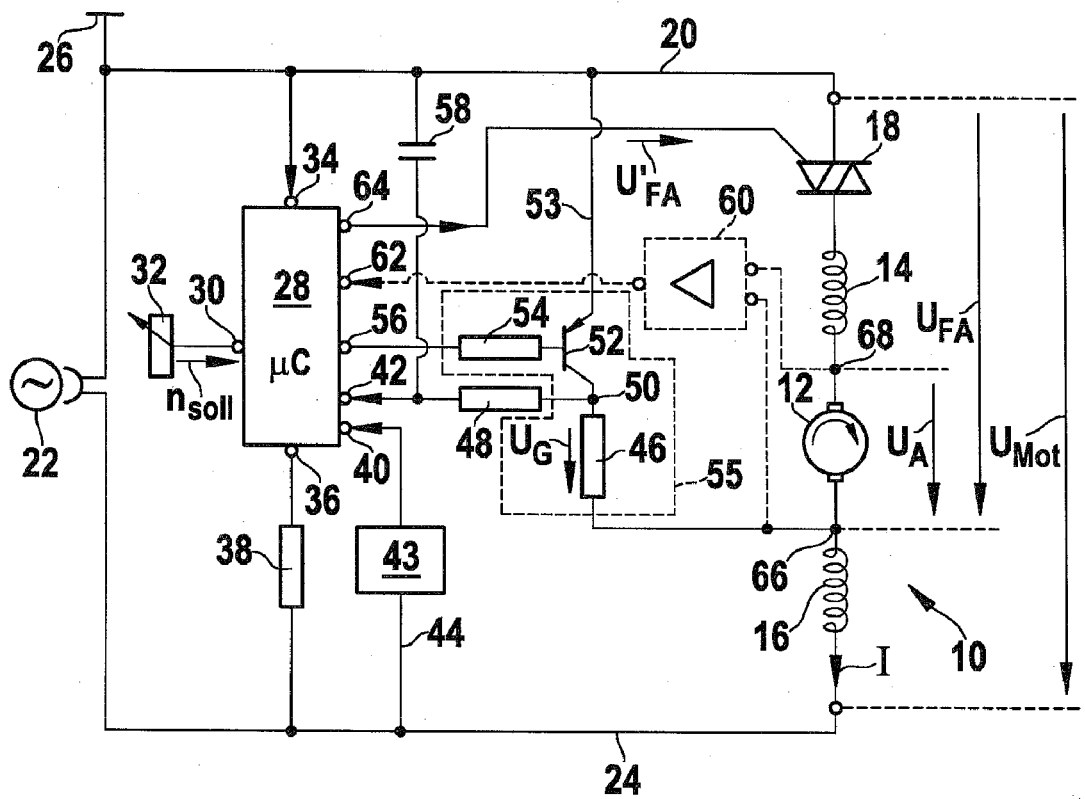

| | | | |
|---|---|---|---|
| 4,259,623 A | * 3/1981 | Moeder et al. | 318/249 |
| 4,481,448 A | * 11/1984 | Bishop | 318/248 |
| 4,618,805 A | 10/1986 | Hornung | |
| 5,530,325 A | * 6/1996 | Friedrich et al. | 318/245 |
| 5,760,553 A | * 6/1998 | Astic et al. | 318/244 |
| 2001/0019660 A1 | 9/2001 | Ohno et al. | |

FOREIGN PATENT DOCUMENTS

| | | |
|---|---|---|
| EP | 0 836 269 | 4/1998 |
| EP | 1 659 683 | 5/2006 |

* cited by examiner

METHOD AND CIRCUIT FOR REGULATING THE SPEED OF A COMMUTATOR SERIES-WOUND MOTOR

PRIOR ART

The invention relates to a method and a circuit for regulating the speed of a commutator series-wound motor, in particular a universal motor, according to the preamble to the primary claims 1 and 8.

Devices of this kind are fundamentally known; in the context of a so-called UI regulation, the motor voltage present and—via the shunt situated in the load circuit—the motor current are detected as input variables for the control of the motor. A motor speed regulation of this kind is described, for example, in DE 34 22 458 C2, which discloses a circuit having a triac as a switch element and a low-impedance resistor as a current sensing element in the main circuit of a universal motor. This arrangement functions in an essentially satisfactory fashion, but the costs of the circuit are relatively high, dictated on the one hand by a low-impedance precision resistor and on the other hand by a relatively expensive circuit for conditioning and evaluating the measurement signal for the motor current.

The object of the invention is to create a method and a circuit for regulating a commutator series-wound motor, which permits an exact, reasonably priced speed regulation of the motor with a reduced circuit complexity. This is achieved by the characterizing features of the primary claims; it is no longer necessary to detect the motor current as an input variable for the control unit. Instead, the voltage drop $U_A$ at the armature, which has a known relationship to the motor current I, or preferably, the easier-to-detect voltage drop $U_{FA}$ at the armature winding and at a part of the field winding, serves as an additional control variable in the speed regulation of the motor. The changes to these voltage drops can then be provided to the control unit of the apparatus as regulating variables in lieu of the current changes produced as a function of the load of the motor. It is no longer necessary to detect the motor current directly.

In a symmetrically constructed universal motor, it has turned out to be advantageous if in addition to the signal of the total motor voltage, the control unit also receives a signal corresponding to the sum of the voltage drops at the armature and at one of two equal parts of the field winding. This sum voltage can be easily picked up at the motor, particularly if the known, essentially constant voltage drop at the semiconductor switch element of the motor is detected at the same time so that a measuring point with a fixed reference potential is situated directly at the ground-connected supply line to the alternating voltage source. The total voltage drop at the motor, suitably including the voltage drop at the semiconductor switch element for the motor, is detected directly at the supply lines to the alternating voltage source.

The detection of voltage values that can be used for speed regulation of a commutator series-wound motor can alternatively also occur in that in addition to the total motor voltage, as a replacement signal for the magnitude of the motor current, only the voltage drop at the armature is detected. Since this voltage drop, however, does not have a fixed reference potential, the measurement signal must be conditioned in a differential amplifier.

In order to increase the measurement precision in the detection of the measurement voltage changes that are of interest, it is useful if these are determined without the unchanging voltage portion of the total voltage drop occurring at the motor. This is achieved in a particularly simple and advantageous fashion because in particular, the measurement voltage $U_{FA}$ based on the sum of the voltage drop at the armature and at a part of the field winding are superposed with an opposing DC voltage $U_G$, which at least partially compensates for this unchanging portion of the voltage. In the simplest case, this can occur in that the measurement voltage is superposed with a constant DC voltage, for example by connecting a zener diode into the measurement circuit. As a result, the amount of the constant DC voltage, which is in opposition to the measurement voltage and drops at the zener diode, is not included in the measurement voltage supplied to the control unit, thus increasing the of-interest portion of the measurement voltage that changes. A significant improvement of the voltage compensation is also achieved in that the magnitude of the DC voltage superposed on the measurement voltage is set to vary in accordance with the detected motor voltage. This can be achieved in a simple fashion in terms of the circuitry by means of a current source in that a transistor situated in the measurement circuit and connected in series with a measurement resistor is controlled via a port of the control unit in accordance with the motor voltage present. In the simplest case, this is a bipolar transistor whose emitter is connected to the connection line of the alternating voltage source, which line is connected to the ground of the circuit, and whose collector is connected via a measurement resistor to the connection of the armature, which is remote from the ground of the circuit. As a result, the magnitude of the DC voltage superposed on the measurement voltage can be changed in a particularly useful fashion by means of the control unit itself so that afterward, only the change in the measurement voltage is visible at the collector of transistor.

Other details and embodiments of the method according to the invention and of the circuit that can be used to carry out the method ensue from the dependent claims and from the description of the exemplary embodiments.

Figure 2:
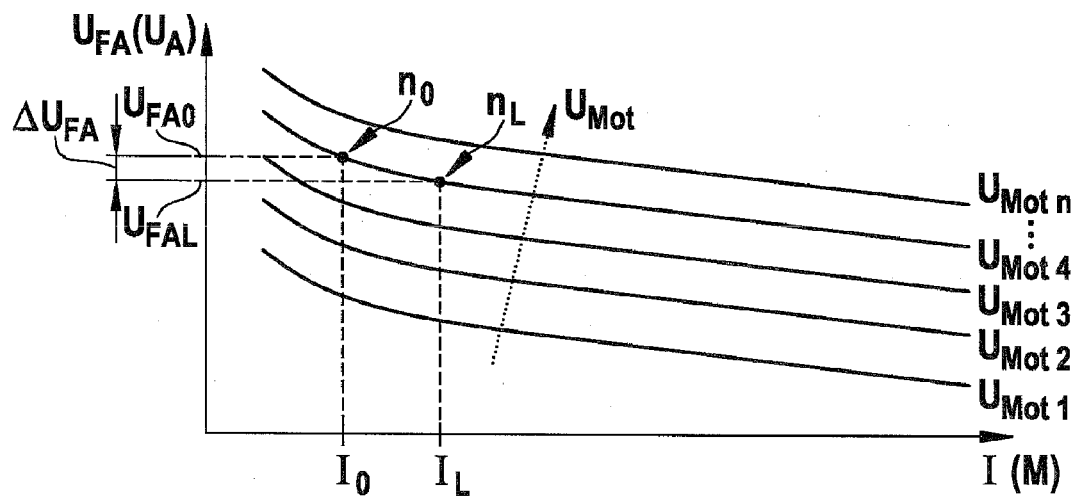
Figure 3:
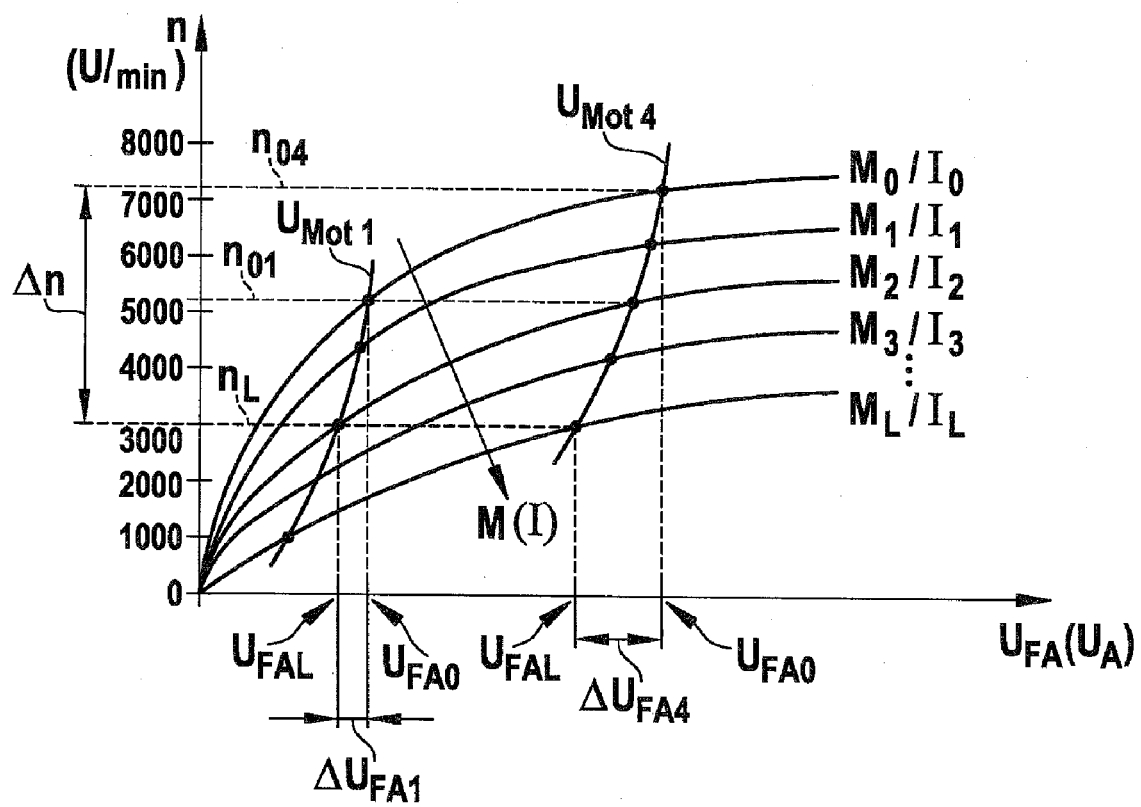

FIG. 1 shows a circuit according to the invention for regulating the speed of a commutator series-wound motor, which can be implemented without a current sensing element, solely through detection of suitable measurement voltages, FIG. 2 is a depiction of the measurement voltage $U_{FA}$ detectable in the armature in a part of the field winding as a function of the motor current I, with a characteristic curve family that corresponds to different total voltage drops at the motor, and FIG. 3 is a depiction of different speed characteristic curves of a motor as a function of the voltage drop $U_{FA}$ at the armature and at a part of the field winding at various torques and load moments $M_0$ to $M_n$.

In FIG. 1, a universal motor is labeled as a whole with the reference numeral 10 and has an armature 12 and two equal field winding halves 14 and 16. The motor 10 is connected via a semiconductor switch element in the form of a triac 18 and via a line 20 to a connection of an alternating voltage source 22. At its other connection, the motor 10 is connected via a line 24 to the other pole of the alternating voltage source 22. The supply line 20 is also connected to ground 26 as a reference potential for the circuit.

The motor 10 is controlled by means of a control unit in the form of a microcontroller 28, which receives a speed input signal $n_{setpoint}$ via an input 30 and an actuating device depicted as a potentiometer 32. An input 34 of the microcontroller 28 is connected to the line 20 and for grid synchronization, another connection 36 of the microcontroller is connected to the supply line 24 to the alternating voltage source 22 via a series resistance 38 of for example 1 MΩ. The DC voltage supply of the microcontroller 28 is not shown in the drawing and occurs in the known fashion by means of a constant voltage source of 5 V, for example.

As control variables for the speed regulation of the motor 10, the microcontroller 28 on the one hand uses the total voltage drop at the motor $U_{mot}$ and on the other hand, as a replacement signal for the magnitude of the motor current I, uses the voltage drop $U_{FA}$ of the series circuit composed of the armature 12, the field winding half 14, and the triac 18 or optionally uses the voltage drop $U_A$ at the armature. When detecting both the total voltage drop $U_{mot}$ and the measurement voltage $U_{FA}$, the essentially constant voltage drop of approximately 2 V at the triac 18 is included since the external connection of the motor 10 to the line 20 is more easily accessible. The voltage drop at the triac 18 is of no interest for determining the speed.

The microcontroller 28 receives the measurement voltages $U_{mot}$ and $U_{FA}$ on the one hand via the input 34 and on the other hand via the inputs 40 and 42. In this case, the outer end of the field winding 16 is connected via the line 24, a suitable measurement circuit or measurement value conditioning 43, and a line 44 to the input 40 of the microcontroller 28 in order to detect the total voltage drop $U_{mot}$. The voltage drop $U_{FA}$ at the armature 12 and at the field winding half 14 travels from the connection 66 of the armature winding 12 via resistors 46 and 48 to the input 42 of the microcontroller 28. In this instance, a connecting point 50 between the resistors 46 and 48 is connected to the line 20 via the collector and emitter paths of a transistor 52 and via a line 53. The base of the transistor 52 is connected via a series resistor 54 to a port 56 of the microcontroller 28. In addition a capacitor 58 is connected between the line 20 and the input 42 of the microcontroller 28 in order to smooth the measurement signal.

Alternative to detecting the measurement voltage $U_{FA}$, as a replacement signal for the magnitude of the motor current I, it is also possible to detect the voltage $U_A$ at the armature 12 of the motor 10, as indicated with dashed lines in FIG. 1. In this case, the voltage $U_A$ at the armature winding is supplied to the inputs of a differential amplifier 60, whose output is present at an input 62 of the microcontroller 28. The triac 18 is triggered via the output 64 of the microcontroller 28.

The method according to the invention and the proposed circuit function as follows:

After the connection of the alternating voltage source 22 and the predetermination of a setpoint speed $n_{setpoint}$ at the potentiometer 32, the microcontroller 28 switches the triac 18 into the conductive state and a motor current I flows via the winding of the armature 12 and the two field winding halves 14 and 16. The total voltage drop $U_{mot}$ at the motor including the voltage drop at the triac 18 travels to the microcontroller 28 via the inputs 34 and 40. In addition, between the inputs 34 and 42, a voltage signal is present in accordance with the voltage $U_{FA}$, which drops by means of the armature 12, the field winding half 14, and the triac 18, reduced by the voltage drops at the resistors 46 and 48. The voltage at the port 56 of the microcontroller 28 varies in accordance with the total voltage drop $U_{FA}$. This potential is lower than the potential in the supply line 20 so that via the emitter and base of the transistor 52, a control current develops, which initiates a current via the emitter/collector path of the transistor 52 and via the resistor 46. The DC voltage drop $U_G$ at the resistor 46 produced by this current is in opposition to the measurement voltage $U_{FA}$ in the half-wave of the alternating voltage 22 detected for the control and, with appropriate dimensioning of the resistors 46 and 48, reduces the measurement voltage $U_{FA}$ by its unchanging portion (offset) to the portion $U_{FA}'$ that is proportional to the motor current I and that actually drops at the armature 12 and at the field winding half 14. The voltage curve and the dependency of the voltage magnitude on the motor current I will be explained in greater detail in conjunction with FIGS. 2 and 3.

The capacitor 58, which is situated between the connection 42 on the microcontroller 28 and the supply line 20 from the alternating voltage source 22, smoothes the measurement voltage signal and suppresses interfering voltage spikes. After the integration of the measurement voltage by the capacitor 58, this yields a measurement voltage $U_{FA}'$, which is reduced by the value $U_G$ (offset) to the voltage level of the microcontroller 28, i.e. in the voltage range of up to approximately 5 V. The measurement voltage $U_{FA}'$ corresponds to the average motor current controlled by the triac 18 and consequently also to the average internal motor moment. The unfavorable relationship between the relatively high unchanging portion of $U_{FA}$ on the order of 200 V with a 220 V alternating voltage source and the significantly lower voltage drop $U_{FA}$ at the armature 12 and at the field winding half 14 on the order of 20 to 40 V is reduced to the portion $U_{FA}'$ of the measurement voltage $U_{FA}$ that is actually to be detected; this reduction is achieved by subtracting the DC voltage $U_G$ at the resistor 46, which varies in accordance with the offset. The component 55, which is composed of the transistor 52 and the resistors 46 and 54 and is framed by a dashed line, makes it possible to automatically correct the magnitude of the DC voltage $U_G$ through control of the transistor 52 by means of the microcontroller 28. The component 55 functions as a current source, with the current magnitude being tracked by the microcontroller 28 in accordance with the total measurement voltage $U_{FA}$ including the offset. The voltage drop $U_G$ at the resistor 46 corresponds to the offset.

FIG. 2 shows the curve of the measurement voltage drop $U_{FA}$ as a function of the motor current I and therefore also as a function of the moment M that the motor 10 is capable of delivering. The different essentially parallel characteristic curves of the measurement voltages $U_{FA}$ constitute a family of curves that corresponds to the total measurement voltages $U_{mot}$ detectable at the motor 10, where the measurement voltages $U_{mot}$, which each slope downward as the current I rises, define higher characteristic curves as the motor voltage $U_{mot}$ rises. The curve of the individual measurement voltage $U_{FA}$ at a constant total voltage drop $U_{mot}$ is determined by the current I that occurs with a change in the motor load. Without readjustment, for example at the motor voltage $U_{mot4}$, the measurement voltage $U_{FA0}$ yields the idle current $I_0$ and the measurement voltage $U_{FAL}$ yields the full load current $I_L$. The corresponding speeds $n_0$ at idle and $n_L$ at full load can be inferred from the curve family according to FIG. 3. For the measurement voltages $U_{FA0}$ and $U_{FAL}$, with a constant motor voltage $U_{mot4}$, based on the intersection points with the load characteristic curves $M_L$ and $M_0$ and/or $I_L$ and $I_0$, this curve family yields the speeds $n_0$ at idle and $n_L$ at full load. Based on a setpoint speed $n_{setpoint}$, this characteristic curve family can be used to determine the load-dependent speed drop and, in accordance with the resulting voltage difference $\Delta U_{FA}$, it is possible to determine the increase in motor voltage required to maintain the preset speed $n_{setpoint}$.

The circuit variant that is depicted with dashed lines in FIG. 1 and is equipped with a differential amplifier 60 offers a possibility, in lieu of detecting the voltage drop $U_{FA}$, of detecting the voltage drop $U_A$ directly at the terminals of the armature winding and supplying it to the microcontroller 28 as a control variable in lieu of the motor current I. In this case, however, a differential amplifier 60 is also required since there is no available reference potential. The depiction of the measurement curves in FIGS. 2 and 3 also applies to this circuit. In both circuit variants, i.e. both with the detection of the measurement voltage $U_A$ solely at the armature and with the detection of the measurement voltage $U_{FA}$ at the armature winding and at the field winding half 14, the measurement and regulation are each based on only one half-wave of the alternating voltage source 22. This is the negative half-wave in the circuit shown, with the internal ground 26 at the line 20.

The characteristic curves of FIGS. 2 and 3 are stored in the microcontroller 28. The regulation of the triac 18 by the microcontroller 28 is then respectively carried out in accordance with the measured voltage difference $\Delta U_{FA}$ between two points on the characteristic curve and in accordance with the measured motor voltage $U_{mot}$.

What is claimed is:

1. A method for regulating the speed of a commutator series-wound motor, in particular a universal motor, that is supplied with current from an alternating voltage source via a semiconductor switch element, which is connected in series with the armature winding and field winding and is controlled by a control unit in accordance with a setpoint speed,
    wherein the control unit (28) is supplied with input signals—on the one hand in the form of a signal that corresponds to the total voltage drop ($U_{mot}$) at the motor (10) with a current flow (I) and on the other hand in the form of a replacement signal for the magnitude of the motor current (I) in accordance with the voltage drop ($U_A$, $U_{FA}$) at the armature (12) alone or at the armature (12) and at a part (14) of the field winding (14, 16)—and in the control unit (28), these input signals are compared to motor-typical characteristic curves ($U_A$, $U_{FA}$=f(I, $U_{mot}$)) of the voltages in the excitation field (14) and/or at the armature (12) and, based on the deviations ($\Delta U_A$; $\Delta U_{FA}$), control signals are generated for the semiconductor switch element (18).

2. The method as recited in claim 1,
    wherein in addition to the signal of the total motor voltage ($U_{mot}$), the control unit (28) also receives a signal corresponding to the sum ($U_{FA}$) of the voltage drops at the armature (12) and at one (14) of two preferably equal parts (14, 16) of the field winding.

3. The method as recited in claim 1,
    wherein as a replacement signal for the magnitude of the motor current (I), the control unit (28) is supplied with a signal that is amplified in a differential amplifier (60) in accordance with the magnitude of the armature voltage ($U_A$).

4. The method as recited in claim 1,
    wherein the measurement voltage ($U_{FA}$, $U_A$) is superposed with an opposing DC voltage ($U_G$).

5. The method as recited in claim 4,
    wherein it is possible for the magnitude of the DC voltage ($U_G$) with which the measurement voltage ($U_{FA}$, $U_A$) is superposed to be changed as a function of the change of the measurement voltage ($U_{FA}$, $U_A$).

6. The method as recited in claim 4,
    wherein it is possible for the magnitude of the DC voltage ($U_G$) with which the measurement voltage ($U_{FA}$, $U_A$) is superposed to be changed by the control unit (28) itself.

7. A circuit for regulating the speed of a commutator series-wound motor, in particular a universal motor, that is supplied with current from an alternating voltage source via a semiconductor switch element, which is connected in series with the armature winding and field winding and is controlled by a control unit in accordance with a setpoint speed, in particular for carrying out the method as recited in claim 1,
    wherein the control unit (28) is connected by means of a first input (34) to a connection line (20) of the alternating voltage source (22) connected to ground (26), is connected by means of a second input (40) via a circuit (43) for measurement value conditioning to a second connection line (24) of the alternating voltage source (22), and is connected by means of a third input (42) to the connection (66) of the armature (12) remote from ground (20).

8. The circuit as recited in claim 7,
    wherein the third input (42) of the control unit (28) is connected to the connection (66) on the armature (12) via an auxiliary voltage source ($U_G$) whose polarity is reversed in relation to the measurement voltage ($U_{FA}$).

9. The circuit as recited in claim 8,
    wherein the auxiliary voltage source ($U_G$) is embodied as a controlled DC voltage source (46, 52, 54).

10. The circuit as recited in claim 9,
    wherein the auxiliary voltage source ($U_G$) has a transistor (52), which is controlled by means of an additional connection (56) of the control unit (28) as a function of the change in the motor voltage ($U_{mot}$) and whose load path is situated via a series resistor (46) between the connection line (20) of the alternating voltage source (22) that is connected to ground (26) and the connection (66) of the armature (12) that is situated remote from said ground.

11. A circuit for regulating the speed of a commutator series-wound motor, in particular a universal motor, that is supplied with current from an alternating voltage source via a semiconductor switch element, which is connected in series with the armature winding and field winding and is controlled by a control unit in accordance with a setpoint speed, in particular for carrying out the method as recited in claim 1,
    wherein the control unit (28) is connected by means of a first input (34) to a connection line (20) of the alternating voltage source (22) connected to ground (26), is connected by means of a second input (40) to a second connection line (24) of the alternating voltage source (22), and is connected by means of a third input (62) to the output of a differential amplifier (60) whose inputs are connected to the connections (66, 68) of the armature (12).

* * * * *